June 8, 1954  E. B. HEDGPETH  2,680,626
WEIGHT EQUALIZING COUPLER
Filed Dec. 15, 1951
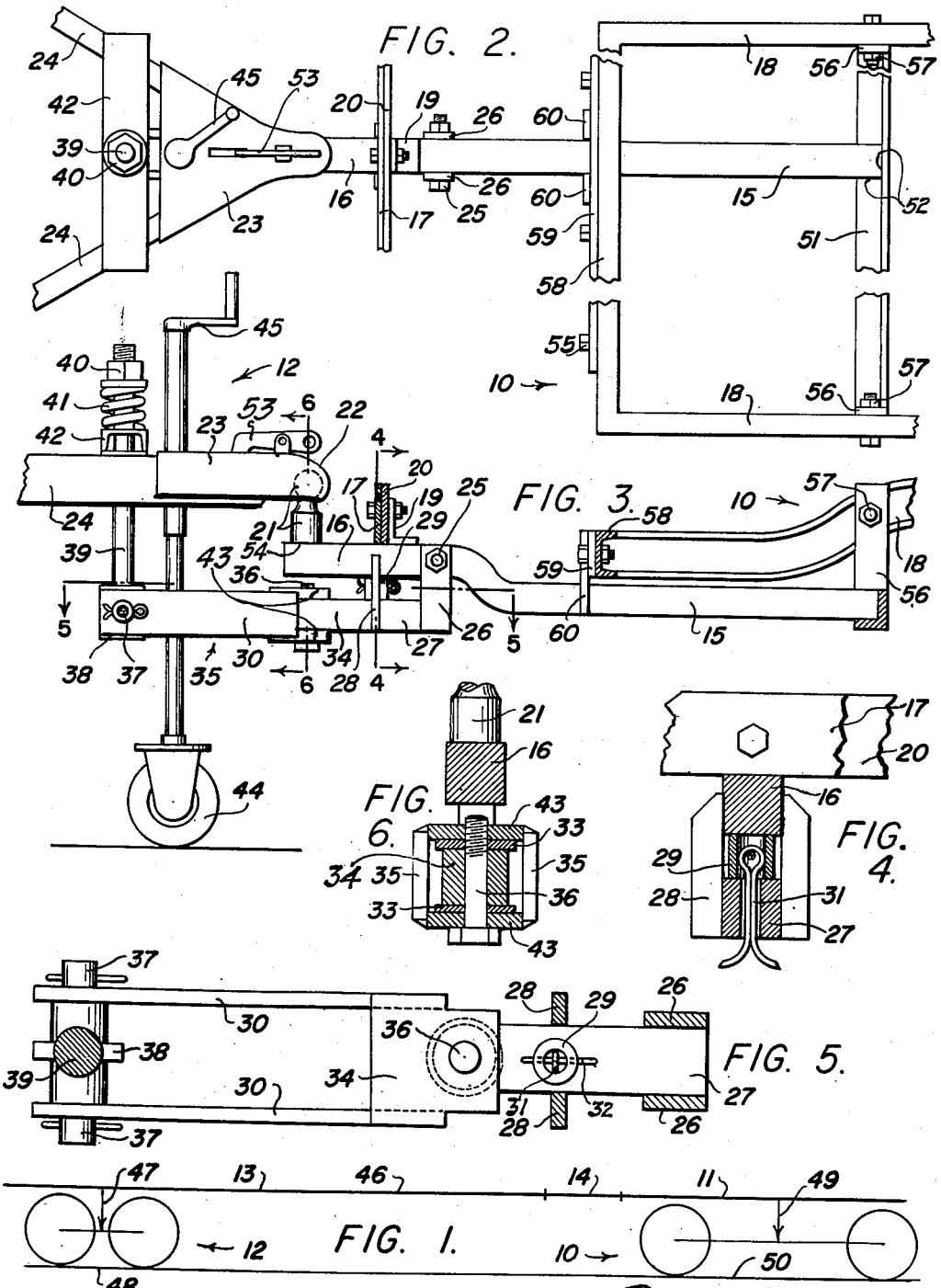
Inventor:
EDWARD B. HEDGPETH Patented June 8, 1954

2,680,626

UNITED STATES PATENT OFFICE 2,680,626

WEIGHT EQUALIZING COUPLER

Edward B. Hedgpeth, Salt Lake City, Utah

Application December 15, 1951, Serial No. 261,810

10 Claims. (Cl. 280—406)

This invention relates to a weight-equalizing coupler as applied to automotive vehicles and trailers connected thereto.

The principal object of the invention is to provide an articulative joint between the automotive or traction vehicle and trailer vehicle, which tends to maintain the body planes of the two in substantial horizontal alignment with each other.

Other important objects include:

(a) Simplicity of construction.

(b) Simplicity and rapidity of performing the hitching operation between the automotive vehicle and its trailer.

(c) Absence of expensive changes in either traction vehicle or trailer to adapt these to the construction of the coupler or vice versa.

(d) Elimination of the usual dolly wheel.

Other objects and features will be found as the following description progresses.

Heretofore, couplers for hitching trailers to tractive units have almost invariably consisted of so-called dollies carried on individual caster wheels, the object having been to support a certain proportion of the weight from the tongue of trailers on the dolly wheel and a greater proportional part on the rear wheels of the tractive unit. This objectionable prior arrangement has the tendency to lift the front of the tractive unit, thereby concentrating an excessive load on the rear wheels of the tractive unit. This among other things, tends to cause undue tire wear and difficult steering.

A feature of the invention is that the coupler unites the frame of the tractor to the frame of the trailer, so that the two act as a continuous flat beam extending from the center of traction to the center of traction. In other words, the coupler effect extends virtually in a straight line from center to center of the wheel bases of the automotive vehicle and the trailer, respectively.

Another feature is that the coupling operation is extremely simple. In performing this operation, all that is necessary is to elevate the tongue of the trailer, by means, for example, of the usual built-in lifting jack, to a point where the ball part of the ball and socket member can be pushed under the socket member of the tongue of the trailer, and the trailer socket be allowed to settle on the ball. Thereupon, the two frames are brought into substantially the desired alignment with each other.

In attaining the objects of the invention, it is convenient, in adapting the coupler to an existing vehicle, to attach an outrigger cantilever member to the frame of the tractive unit. The power or outrigger arm of the cantilever extends beyond the rear bumper sufficiently, so that the ball of the usual ball-and-socket assembly is supported near the tip of the power arm. At the same time, the shank of the cantilever is extended under the frame of the tractive unit, and forms the work arm of the cantilever. The fulcrum for the cantilever acts at the same time as the fulcrum of a lever which cooperates with the aforementioned cantilever to bring certain stresses to a cushioned bearing on the trailer tongue. Altogether, the lever arrangement constitutes a static assembly which makes possible the desired results.

In the accompanying drawing which illustrates an excellent embodiment of the invention:

Fig. 1 represents a schematic line diagram in side elevation of a tractive unit and trailer connected to each other in accordance with the provisions of the invention;

Fig. 2, a plan of the apparatus of the invention, with fragmentary portions of a tractive unit and a trailer, coupled together;

Fig. 3, a side elevation corresponding to Fig. 2, this view being partially in section taken along the longitudinal center line of Fig. 2;

Fig. 4, a cross-section taken on the line 4—4 in Fig. 3, drawn to an enlarged scale;

Fig. 5, a fragmentary plan, partially in section, taken along the line 5—5 in Fig. 3, drawn to the same scale used in Fig. 4;

Fig. 6, a cross-section taken largely along the line 6—6, in either Fig. 3 or in Fig. 5.

Referring to the drawing, the arrow 10, Figs. 1, 2 and 3, points in the direction of an automotive unit such as an automobile, of which the longitudinal line of the chassis, when level, is indicated approximately at 11, Fig. 1. The arrow 12 points in the direction of a trailer, such as a house trailer, of which the longitudinal frame line, when level, is indicated approximately at 13, Fig. 1. The line portion 14, Fig. 1, indicates approximately the location of the weight equalizing coupler of the invention.

A cantilever extension 15, advantageously applicable to existing tractive units, includes an outrigger arm 16 which is preferably attached to and projects beyond the usual bumper 17 of the tractive unit. In cases where the invention is made original equipment, different manufacturers can obviously make changes in the extension 15 to suit. For this reason no alternative design is shown in the present drawing.

The outrigger arm 16 is fixed on the bumper 17, in this instance by means of a bracket 19, and is reinforced at 20. The arm 16 at its extremity has fixed the ball member 21 of a usual ball-and-socket coupler. The socket member 22 of such a coupler has the housing 23 which is rigidly attached to the tongue 24 of the trailer frame, as usual.

Suspended from a pivot pin 25 located forwardly of the bumper 17 is a hanger 26, to which is rigidly connected, for instance by welding, a lever arm 27, which is integral with an opposing arm 34, the latter having the continuation 35. The portion 34 and the continuation 35 are hinged together, in this instance by means of a pin 36 which allows the arm extension to swivel in a substantially horizontal plane with respect to the portion 34. The free extremity of the continuation 35 is pivotally suspended by means of a pin 37, which passes through the eye 38 of a spring suspended hanger rod 39. This rod at its upper end is provided with a threaded nut 40 which bears on a compression spring 41. The latter, in turn, bears on a crosspiece 42 which spans the V-tongue of the trailer.

In this instance the cantilever 15—16 forms virtually an extension of the tractive frame side members 18 and may be regarded as being fulcrumed on a center bearing 29, see Figs. 3 and 4.

The center bearing 29 is subjected to heavy stresses because of the weight of the trailer-tongue 24 resting on arm 16. To avoid displacement of 29, a split cotter pin 31, Fig. 4, has its head in the bearing, while the legs extend through the two-part arm 27—34. Fins 28 which are fast on the two-part arm 27—34, for instance by welding, form a fork in which 16 is loosely held to assist in keeping the latter in alignment with two-part arm 27—34. Cotter pin 31 has a small cotter pin 32.

As a result, the cantilever 15—16 is interlocked in substantially static relation with the arms 27 and 34, and indirectly with the extension 35. The extension 35 is made up of the respective parallel, spaced side pieces 30. The latter may be welded to upper and lower short plates 43, which together, form a pair of jaws in which 34 is held for limited horizontal oscillation around a pivot pin 36 which serves as a hinge pin between arm 34 and extension 30. It is beneficial to place washers 33 between the arm 34 and the respective jaws 43.

By way of illustration, the invention provides a cross member 51 having the turned-up integral hanger ends 56. The latter are bolted at 57, or otherwise connected to the respective side members 18 of the tractive unit. The end portion of the lever arm 15 may be welded at 52 to the cross member 51, thus forming a connection to the automotive unit. A second connection consists of depending bars 60, which are welded or otherwise fastened to both the lever arm 15 and to a reinforcing bar 59. The reinforcing bar is rigidly, but removably, fastened, for example by bolts 55 to a rear cross member 58, which forms a part of the usual frame of a tractive unit.

The socket 22 of the coupler is operated by means of a lever 53. The ball member is advantageously welded to the arm 16 at 54.

To be noted is that the pin 36 and the ball member 21 are substantially in axial alignment with each other so as to form a king-pin or fifth wheel connection between the tongue of the trailer and the arms 16 and 34.

The tongue of the trailer is provided with any usual lifting jack supported on the caster wheel 44. The appurtenant parts of the lifting jack terminate in the crank 45. Turning the crank raises or lowers the trailer tongue 24 in the usual manner.

In using the coupler, the apparatus as just described, when properly adjusted, forms a substantially straight center line connection 46 between the center line 47 of the wheelbase 48 of the trailer and the center line 49 of the wheelbase 50 of the automotive unit.

While the foregoing description is somewhat specific, the equitable scope of the desired patent protection is stated in the following claims.

I claim:

1. A weight equalizing coupler, comprising a cantilever having an arm attachable to an automotive unit and an outrigger arm extending from the first mentioned arm; said outrigger arm being adapted to have articulatively mounted thereon, the tongue of a trailer; a fulcrum member disposed to bear on said cantilever; a lever depending from said cantilever and disposed so as to bear upon said fulcrum in opposition to said fulcrum bearing of the cantilever, said depending lever having an arm extending in the direction of said trailer; and a suspension mechanism resting on said tongue in order to support the extending arm of said depending lever.

2. A weight equalizing coupler according to claim 1, wherein said depending lever and its extending arm are articulatively joined to each other so that the axis of articulation thereof is in substantial alignment with the first-mentioned axis of articulation.

3. A weight equalizing coupler according to claim 1, wherein is included cushioning means disposed between said suspension mechanism and the said tongue.

4. A weight equalizing coupler according to claim 1, wherein is included means disposed in proximity to said fulcrum member, whereby said depending lever is held in substantial alignment with said outrigger arm.

5. A weight equalizing coupler according to claim 1, wherein said depending lever is fixed in hanger means pivotally connected to said cantilever at a point in front of said fulcrum.

6. A weight equalizing coupler according to claim 1, wherein the front terminal of the cantilever is rigidly connected to the frame of an automotive unit; wherein said overhanging arm is rigidly connected to the bumper of said automotive unit; and wherein, further, said cantilever, at a point intermediate said front terminal connection and its connection to said overhanging arm, is rigidly connected to the rear frame member of said automotive unit.

7. A weight equalizing coupler, comprising cantilever means having a work arm fixed on the frame of an automotive unit and an outrigger power arm extending beyond said automotive unit; articulative means disposed to support the tongue of a trailer on said power arm; a second lever having a power arm suspended from said cantilever and having its work arm suspended from the tongue of said trailer; and fulcrum means disposed to act in common between said cantilever and said second lever.

8. A weight equalizing coupler according to claim 7, wherein the work arm of the said second lever includes an articulative joint.

9. A weight equalizing coupler according to claim 8, wherein the second lever is composed of a shank disposed to bear upon said fulcrum means and includes an extension fork connected to said shank by means of upper and lower jaws;

and a pivot pin extending through said jaws and through said shank.

10. A weight equalizing coupler, comprising an interacting, static lever system including a final work arm adapted to be fixed to the frame of an automotive unit, an initial power arm provided with means for articulatively connecting it to the tongue of a trailer unit, and an auxiliary lever having the power arm thereof pivotally connected at a fixed point to said initial power arm; fulcrum means disposed between said auxiliary lever and said initial power arm; and suspension means disposed to support the work arm of said auxiliary lever on the tongue of said trailer unit.

References Cited in the file of this patent
UNITED STATES PATENTS

| Number | Name | Date |
|---|---|---|
| 2,453,941 | Smit | Nov. 16, 1948 |
| 2,458,666 | Williams | Jan. 11, 1949 |
| 2,464,392 | Heavener | Mar. 15, 1949 |
| 2,490,645 | Murat | Dec. 6, 1949 |
| 2,507,189 | Arehart | May 9, 1950 |